US012640913B2

(12) United States Patent (10) Patent No.: US 12,640,913 B2
Ragavan et al. (45) Date of Patent: May 26, 2026

(54) COHERENT KEY MANAGEMENT ACROSS MULTIPLE CHIPLETS

(71) Applicant: QUALCOMM Incorporated, San Diego, CA (US)

(72) Inventors: Rengarajan Ragavan, San Diego, CA (US); Arun Menon, San Diego, CA (US); Samar Asbe, San Diego, CA (US); Aseem Brahma, San Diego, CA (US); Shivaprasad Hongal, San Diego, CA (US); Changjian Gao, San Diego, CA (US); Denis Pochuev, Orinda, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 18/468,666

(22) Filed: Sep. 15, 2023

(65) Prior Publication Data

US 2025/0097019 A1 Mar. 20, 2025

(51) Int. Cl.
H04L 9/08 (2006.01)
G06F 21/72 (2013.01)
(52) U.S. Cl.
CPC ............ H04L 9/0838 (2013.01); G06F 21/72 (2013.01)
(58) Field of Classification Search
CPC ... H04L 9/0838; H04L 9/0877; H04L 9/0822; H04L 9/0866; H04L 9/0897; G06F 21/72; G06F 21/445; G06F 21/57; G06F 21/572
USPC ........................................................ 380/44
See application file for complete search history.

(56) References Cited

U.S. PATENT DOCUMENTS

| | | | |
|---|---|---|---|
| 10,146,964 B1 | 12/2018 | Shah et al. | |
| 2022/0067221 A1* | 3/2022 | Schiattarella | H04L 9/088 |
| 2022/0417005 A1 | 12/2022 | Patel et al. | |
| 2023/0187371 A1 | 6/2023 | Parker et al. | |
| 2023/0328045 A1* | 10/2023 | Dastidar | H04L 63/20 |
| | | | 713/171 |
| 2024/0195635 A1* | 6/2024 | Doshi | H04L 9/0869 |

FOREIGN PATENT DOCUMENTS

EP 3506560 A1 * 7/2019 ........... H04L 9/3268

OTHER PUBLICATIONS

International Search Report and Written Opinion—PCT/US2024/045686—ISA/EPO—Dec. 17, 2024.

* cited by examiner

*Primary Examiner* — Bryan F Wright
(74) *Attorney, Agent, or Firm* — Polsinelli LLP

(57) ABSTRACT

Systems and techniques are provided for establishing a connection. For instance, a first chiplet root of trust (C-RoT) of a first chiplet of a plurality of chiplets can receive a request for a cryptographic key. The first C-RoT can generate the cryptographic key and wrap the cryptographic key using a wrapping key to generate a wrapped cryptographic key. The first C-RoT can output the wrapped cryptographic key and a second C-RoT of a second chiplet of the plurality of chiplets can receive the wrapped cryptographic key. The second C-RoT can unwrap the wrapped cryptographic key using the wrapping key and can perform an operation based on the cryptographic key.

30 Claims, 9 Drawing Sheets

400

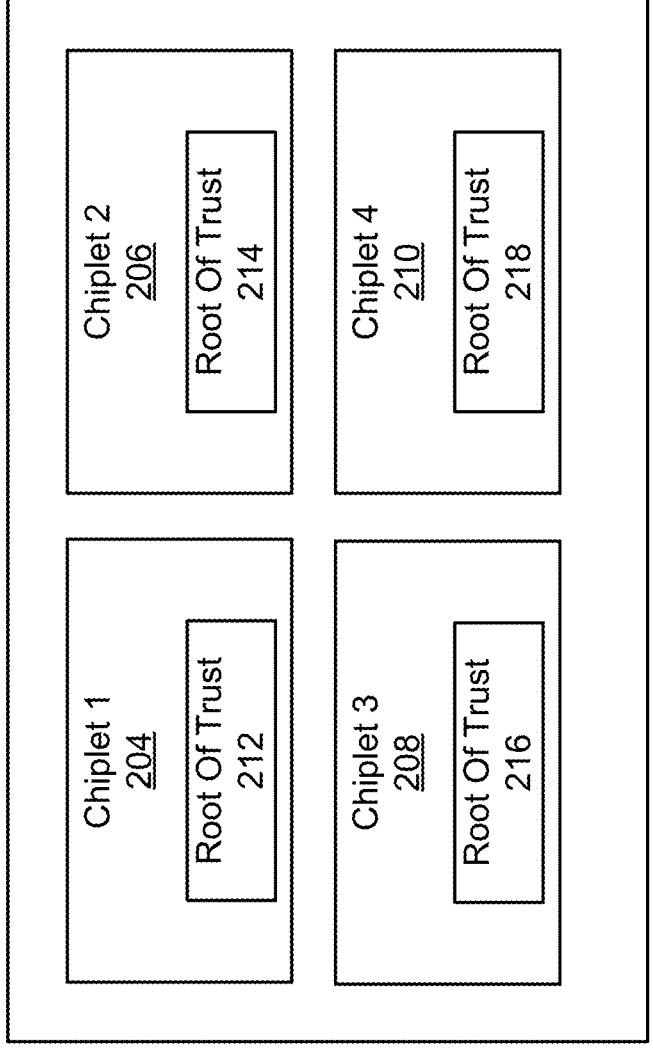
FIG. 2

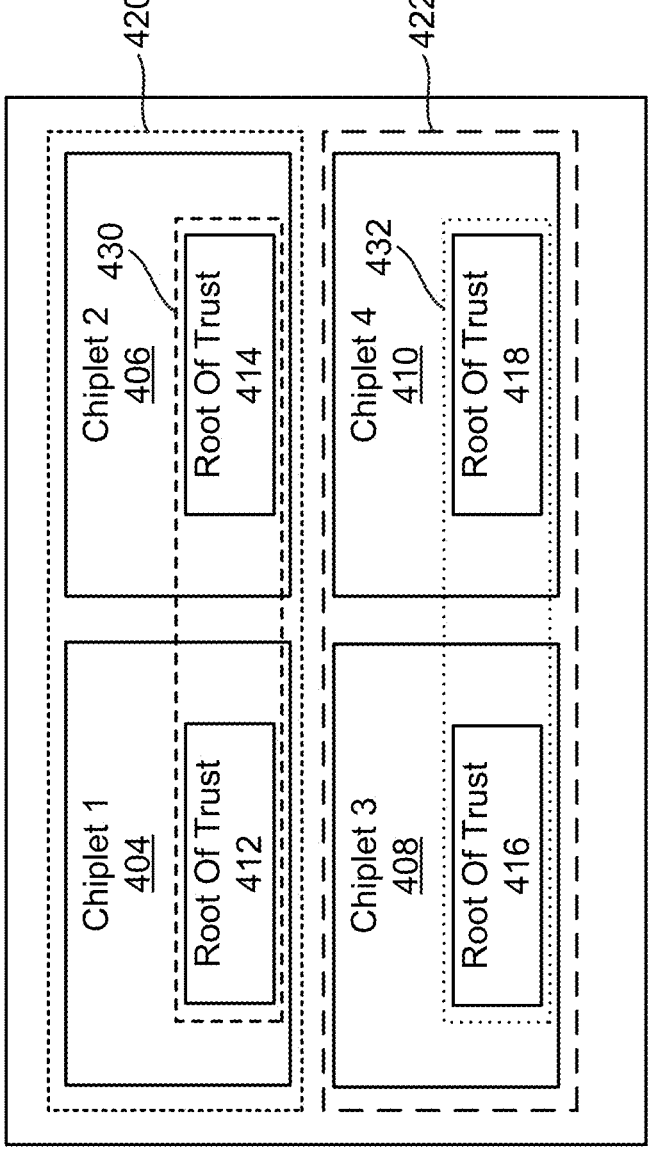
FIG. 4

700

800

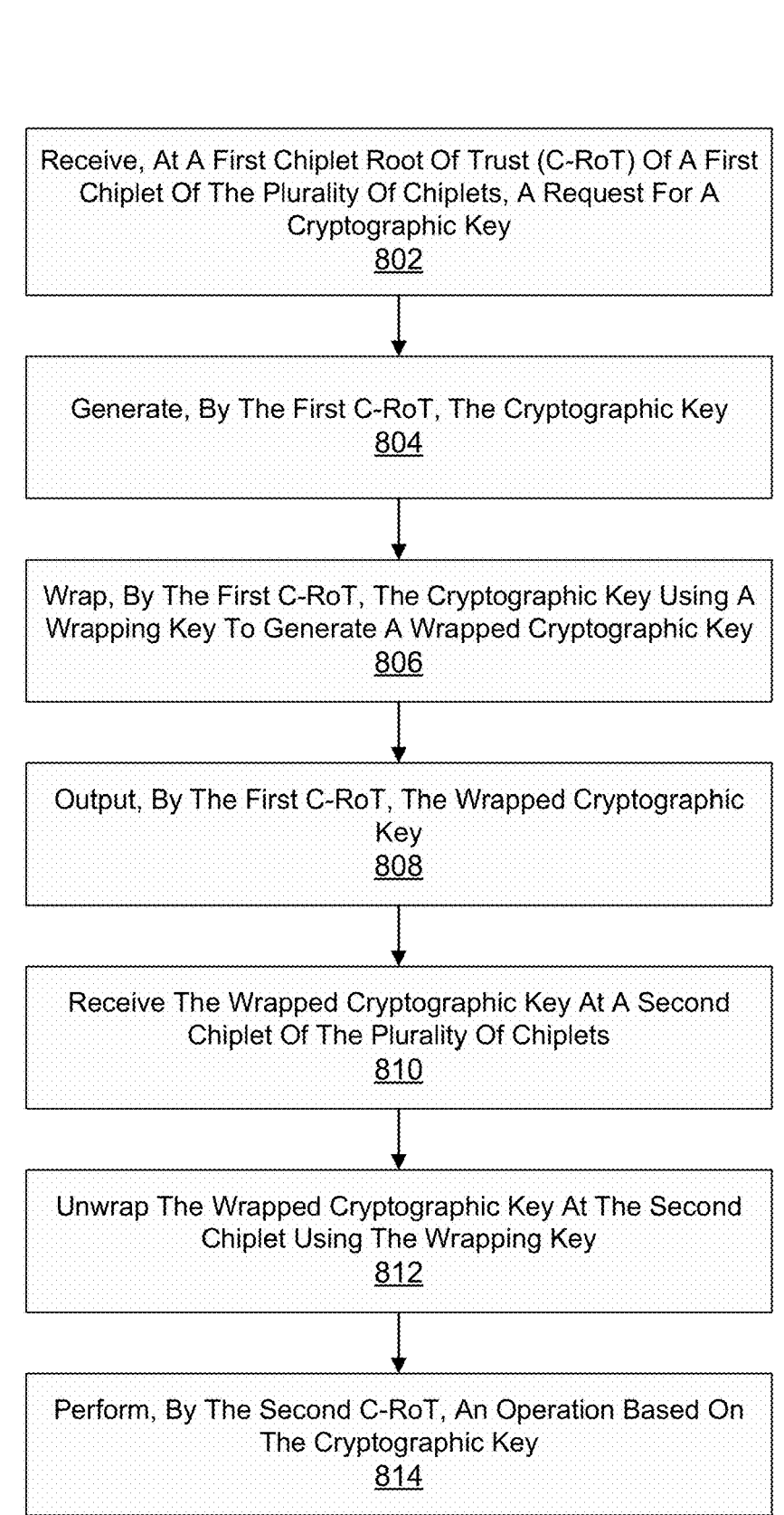

Receive, At A First Chiplet Root Of Trust (C-RoT) Of A First Chiplet Of The Plurality Of Chiplets, A Request For A Cryptographic Key
802

Generate, By The First C-RoT, The Cryptographic Key
804

Wrap, By The First C-RoT, The Cryptographic Key Using A Wrapping Key To Generate A Wrapped Cryptographic Key
806

Output, By The First C-RoT, The Wrapped Cryptographic Key
808

Receive The Wrapped Cryptographic Key At A Second Chiplet Of The Plurality Of Chiplets
810

Unwrap The Wrapped Cryptographic Key At The Second Chiplet Using The Wrapping Key
812

Perform, By The Second C-RoT, An Operation Based On The Cryptographic Key
814

FIG. 8

COHERENT KEY MANAGEMENT ACROSS MULTIPLE CHIPLETS

FIELD

Aspects of the present disclosure generally relate to device security. For example, aspects of the present disclosure relate to coherent key management across multiple chiplets.

INTRODUCTION

Computing devices typically store sensitive data owned by users or enterprises, with firmware or operating system software on the computing devices owned by a computing device or secure module manufacturer. To help secure computing devices, the firmware or software may include security measures to protect against, e.g., removing brute force attack mitigations, disabling secure boot/trust boot, and/or loading other unauthenticated firmware or software on the computing devices. As an example, a processor or SoC may include a RoT, which is a source of information, such as cryptographic keys, that is inherently trusted. In some cases, the ROT may be embedded hardware included in the SoC, such as a hardware based trusted platform module or trusted execution environment.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for secure processing. According to at least one illustrative example, an electronic device is provided. The electronic device includes a memory system comprising instructions and a processor system coupled to the memory system. The processor system includes a plurality of chiplets. The processor system is configured to: receive, at a first chiplet root of trust (C-RoT) of a first chiplet of the plurality of chiplets, a request for a cryptographic key; generate, by the first C-RoT, the cryptographic key; wrap, by the first C-RoT, the cryptographic key using a wrapping key to generate a wrapped cryptographic key; output, by the first C-RoT, the wrapped cryptographic key; receive the wrapped cryptographic key at a second chiplet of the plurality of chiplets; unwrap the wrapped cryptographic key at the second chiplet using the wrapping key; and perform, by the second C-RoT, an operation based on the cryptographic key.

As another example, a method for secure processing is provided. The method includes: receiving, at a first chiplet root of trust (C-RoT) of a first chiplet of a plurality of chiplets, a request for a cryptographic key; generating, by the first C-RoT, the cryptographic key; wrapping, by the first C-RoT, the cryptographic key using a wrapping key to generate a wrapped cryptographic key; outputting, by the first C-RoT, the wrapped cryptographic key; receiving the wrapped cryptographic key at a second chiplet of the plurality of chiplets; unwrapping the wrapped cryptographic key at the second chiplet using the wrapping key; and performing, by the second C-RoT, an operation based on the cryptographic key.

In another example, a non-transitory computer-readable medium is provided. The non-transitory computer readable medium includes stored thereon instructions that, when executed by a processor system, cause the processor system to: receive, at a first chiplet root of trust (C-RoT) of a first chiplet of a plurality of chiplets, a request for a cryptographic key; generate, by the first C-RoT, the cryptographic key; wrap, by the first C-RoT, the cryptographic key using a wrapping key to generate a wrapped cryptographic key; output, by the first C-RoT, the wrapped cryptographic key; receive the wrapped cryptographic key at a second chiplet of the plurality of chiplets; unwrap the wrapped cryptographic key at the second chiplet using the wrapping key; and perform, by the second C-RoT, an operation based on the cryptographic key.

As another example, an apparatus for secure processing is provided. The apparatus includes: means for receiving, at a first chiplet root of trust (C-RoT) of a first chiplet of a plurality of chiplets, a request for a cryptographic key; means for generating, by the first C-RoT, the cryptographic key; means for wrapping, by the first C-RoT, the cryptographic key using a wrapping key to generate a wrapped cryptographic key; means for outputting, by the first C-RoT, the wrapped cryptographic key; means for receiving the wrapped cryptographic key at a second chiplet of the plurality of chiplets; means for unwrapping the wrapped cryptographic key at the second chiplet using the wrapping key; and means for performing, by the second C-RoT, an operation based on the cryptographic key.

Aspects generally include a method, apparatus, system, computer program product, non-transitory computer-readable medium, user equipment, base station, wireless communication device, and/or processing system as substantially described herein with reference to and as illustrated by the drawings and specification.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

FIG. 2 is a block diagram illustrating an SoC including multiple chiplets, in accordance with aspects of the present disclosure;

FIG. 4 is a block diagram illustrating an SoC including multiple platforms with separate security boundaries, in accordance with aspects of the present disclosure;

FIG. 8 is a flow diagram illustrating an example of a process for secure processing, in accordance with aspects of the present disclosure.

DETAILED DESCRIPTION

Figure 1:
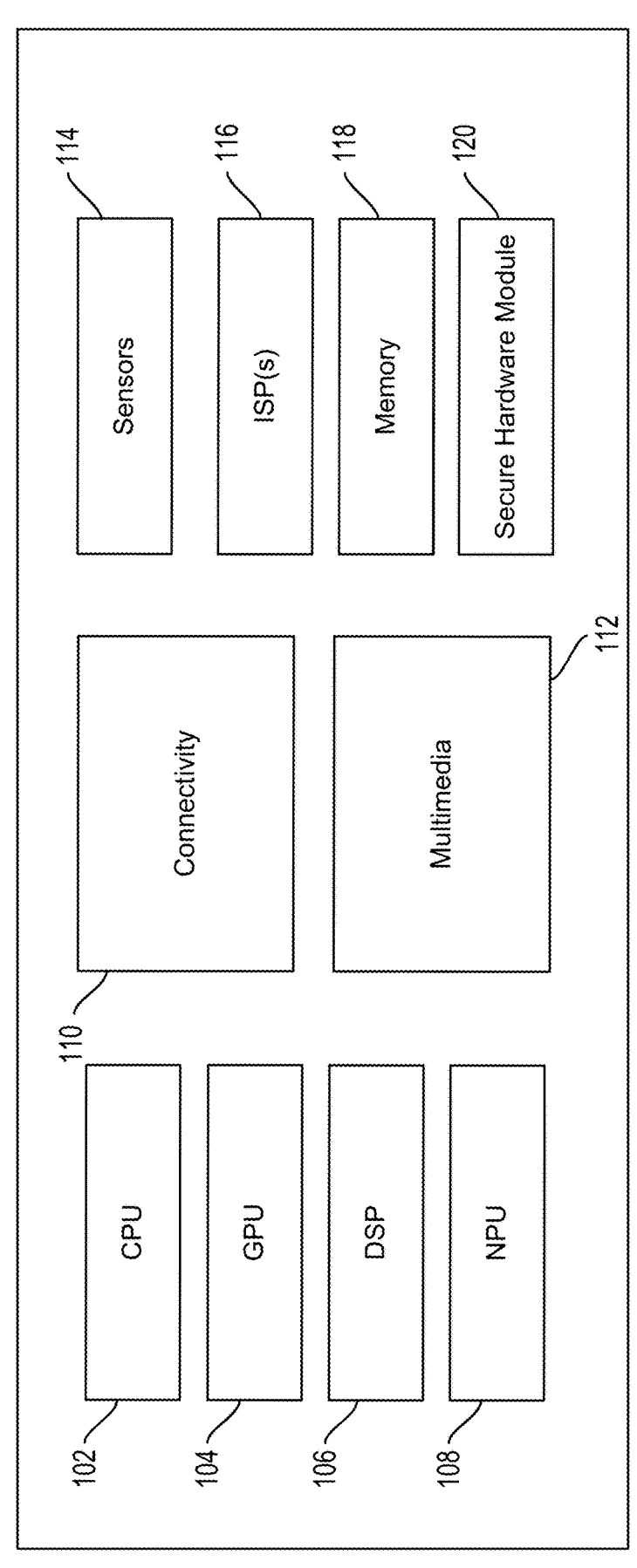
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Recently, some system-on-chip (SoC) designs have begun to use a chiplet based architecture. A chiplet may be an integrated circuit block, a functional circuit block, or other like circuit block specifically designed to work with other chiplets to form a larger, more complex system, such as an SoC. A chiplet may have a well-defined set of functionality and can be combined with other chiplets having another set (or sets) of functionality using an interposer into a single package. In some cases, a root of trust (RoT) may be a foundation for secure operations of a computer system. In some cases, the RoT of a processor may be a hardware component, such as a secure hardware module, of the processor for performing secure operations and the RoT may include a source from which trust may be derived, such as a root certificate. As used herein, operations, actions, processes, etc. of the RoT may refer to operations, actions, processes, etc. of the hardware component that performs secure operations. In some cases, the ROT may execute trusted software to perform secure operations. The RoT may also include firmware programmed to perform certain secure operations. In some cases, each chiplet may include a secure hardware module that acts as a RoT for the chiplet (e.g., chiplet ROT (C-RoT)). The ROT of a chiplet may be used to verify the security and debug states of the chiplet. In some cases, a SoC may include multiple chiplets and the RoTs of the chiplets (e.g., the hardware components of the chiplets which perform secure operations) of the SoC and/or package may collectively establish a common security boundary for the SoC and/or package. The security boundary may refer to hardware and/or software that forms a trusted zone or boundary and provides the basis for performing security services.

In some cases, two or more chiplet RoTs of two or more chiplets may establish a security boundary by mutually authenticating. This mutual authentication may be performed in different ways. For example, during manufacturing, the chiplets may perform mutual authentication using certificate authentication. A common pairing key may be provisioned to the chiplets of the package after this certificate authentication. The common pairing key may be an authentication key for pairing the C-RoTs of the chiplets and the same authentication key (e.g., common) may be provisioned to each C-RoT. After manufacturing, chiplets of the package may mutually authenticate using certificate authentication and/or a provisioned common pairing key during each boot of the package. In some cases, the certificate authentication may be based on a provisioned common pairing key. During operation of the package of chiplets, the chiplets may mutual authenticate using the provisioned common pairing key to establish a common security boundary. In some cases, once the C-RoTs of a package have established a common security boundary, any C-RoT within the common security boundary may perform security functions as needed. Thus, each ROT of the chiplets of the package should be capable of performing key management and distribution operations from a single device unique key. As such, techniques for coherent key management across multiple chiplets may be useful.

Systems, apparatuses, processes (also referred to as methods), and computer-readable media (collectively referred to as "systems and techniques") are described herein for coherent key management across multiple chiplets. In some cases, one C-RoT of a chiplet may derive a key for an application and move that key to another chiplet for potential use by the second C-RoT. For example, the first C-RoT may generate a cryptographic key (e.g., a piece of information, typically a string of characters, which can be used by a cryptographic algorithm to encode or decode data), for example, based on a common pairing key. The first C-RoT may wrap the generated cryptographic key with a wrapping key, such as a common transport key. The first C-RoT may then output the wrapped cryptographic key, for example, to an application. The application may then provide the wrapped cryptographic key to a second cryptographic endpoint of a second C-RoT of a second chiplet. The second cryptographic endpoint may then unwrap the cryptographic key based on the common transport key and perform a requested security operation for the application.

Various aspects of the present disclosure will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The term "mobile device" is used herein to refer to any one or all of cellular telephones, smartphones, Internet-of-things (IOT) devices, personal or mobile multi-media players, laptop computers, tablet computers, ultrabooks, palmtop computers, wireless electronic mail receivers, multimedia Internet enabled cellular telephones, wireless gaming controllers, smart cars, autonomous vehicles, and similar electronic devices which include a programmable processor, a memory and circuitry for sending and/or receiving wireless communication signals to/from wireless communication networks. While the various embodiments are particularly useful in mobile devices, such as smartphones and tablets, the embodiments are generally useful in any electronic device that includes secure boot circuitry for securing access to the electronic device.

Various aspects of the techniques described herein will be discussed below with respect to the figures. FIG. 1. FIG. 1 illustrates an example implementation of a system-on-a-chip (SoC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

In some cases, the SoC 100 may be based on an ARM instruction set. The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SoC 100 may also include a sensor processor 114, image signal processors (ISPs) 116, and/or a secure hardware module 120.

The secure hardware module 120 may include fuses, replay protected memory block (RPMB), secure bits, secure flags, security enabled hardware, secure memory, or hardware, software, or firmware used to implement a secure portion of the operating system, a secure operating system (SOS), a trusted execution environment (TEE), trusted platform module (TPM), etc. The secure hardware module 120 may be used to process and/or store sensitive data in an environment that is segregated from the rich execution environment in which the operating system and/or applications may be executed. The secure hardware module 120 can be configured to execute trusted applications that provide end-to-end security for sensitive data by enforcing confidentiality, integrity, and protection of the sensitive data stored therein. The secure hardware module 120 can be used to store encryption keys, access tokens, and other sensitive data. In some cases, the secure hardware module 120 may serve as a RoT for the SoC 100. For example, the secure hardware module 120 may provide for the secure generation of cryptographic keys, limitations on the use of such cryptographic keys, and may contain one or more cryptographic keys or elements that may be used to authenticate the SoC 100. In some cases, the RoT may serve to anchor a chain of trust to validate other hardware and/or software. In some cases, the secure hardware module 120 may be implemented as a secure area of the CPU 102, as a part of the SoC 100, or any combination thereof.

Traditionally, an SoC may be designed monolithically with fixed set of components etched onto a silicon chip. Some recent SoC designs use a chiplet based architecture. A chiplet may be integrated circuit block, a functional circuit block, or other like circuit block specifically designed to work with other chiplets to form a larger, more complex system, such as an SoC. In the chiplet based architecture, the SoC may be designed using a set of chiplet that may be mixed and matched in a modular manner. For example, a chiplet may have a well-defined set of functionality and can be combined with other chiplets (e.g., having other set(s) of functionality) using an interposer into a single package.

Different packages can be constructed by using different combinations of chiplets. Additionally, chiplets may be independently fabricated and then combined together into a package of chiplets at a later manufacturing stage for integration into a system, such as an SoC. An SoC may have any number of packages of chiplets.

FIG. 2 is a block diagram illustrating an SoC 200 including multiple chiplets, in accordance with aspects of the present disclosure. In this example, the SoC 200 includes 4 chiplets, a first chiplet 204, a second chiplet 206, a third chiplet 208, and a fourth chiplet 210. Of note, while four chiplets are shown in SoC 200, it should be understood that an SoC 200 and/or processor with implemented with chiplets can have n number of chiplets where n≥2.

In a traditional SoC, a single ROT may be used to ensure that the entire SoC is in a common security and debug state. However, in a chiplet based architecture, such as SoC 200, for the SoC 200 to operate properly, each chiplet of the SoC 200 should be in a common security and debug state. For example, chiplets operating in different security and debug states may result in operations that interfere or flat out contradict with each other. Additionally, allowing one chiplet to operate in a secure security state, while another chiplet to operate in a non-secure security state, or allowing one chiplet to operate in a debug state, while another chiplet operates in a non-debug state may provide unwanted attack vectors. In some cases, a RoT may be used to verify the security and debug states of a chiplet and establish a security boundary for the SoC. The security boundary may refer to hardware and/or software that forms a trusted zone or boundary and provides the basis for performing security services. The security boundary established by the hardware and/or software may present a boundary that is not easily bypassed/compromised by an attacker and the hardware and/or software establishing the security boundary may verify that other hardware/software used/executing within the security boundary is trusted. In a chiplet based architecture, it may be useful to allow the security boundary to extend beyond a single chiplet to encompass multiple chiplets. In a chiplet based architecture, it may be useful to allow the security boundary to extend beyond a single chiplet to encompass multiple chiplets. In some cases, a single ROT may be used to establish the security boundary across all of the chiplets. For example, where a RoT is not available (e.g., not present, disabled, etc.) in all of the chiplets, chiplets without the ROT may rely on the ROT of the chiplet with the ROT for security services. However, such an architecture may introduce latency and/or performance challenges when using security services. In cases where an RoT is present in all chiplets (e.g., homogenous chiplets where multiple copies of the same chiplet are used), but only enabled in one chiplet, silicon footprint may also be wasted. Thus, techniques which allow multiple C-RoTs to work together to establish a common security boundary for the SoC 200 may be useful.

To establish a common security boundary (e.g., an SoC RoT/platform RoT), two or more C-RoTs of two or more chiplets may mutually authenticate to establish a single security boundary encompassing the chiplets. As an example, for chiplets with a C-RoT, such as the first chiplet 204 and C-RoT 212, the C-RoT for a chiplet may manage security services local to that chiplet. For example, C-RoT 212 may verify that hardware/software used/executing within the first chiplet 204 are trusted (e.g., in a common security state) and in a same debug state. The C-RoT of the chiplet may also mutually authenticate with a C-RoT of another chiplet to establish a security boundary across the chiplets. For example, C-RoT 212 of the first chiplet 204 may authenticate C-RoT 214 of the second chiplet 206 (and vice versa) and exchange information indicating that the components of the second chiplet 206 are also in common security state (e.g., trusted) and debug state. C-RoT 214 may also authenticate C-RoT 212 and obtain information from C-RoT 212 indicating that components of the first chiplet 204 are in a common security and debug state.

Figure 3:
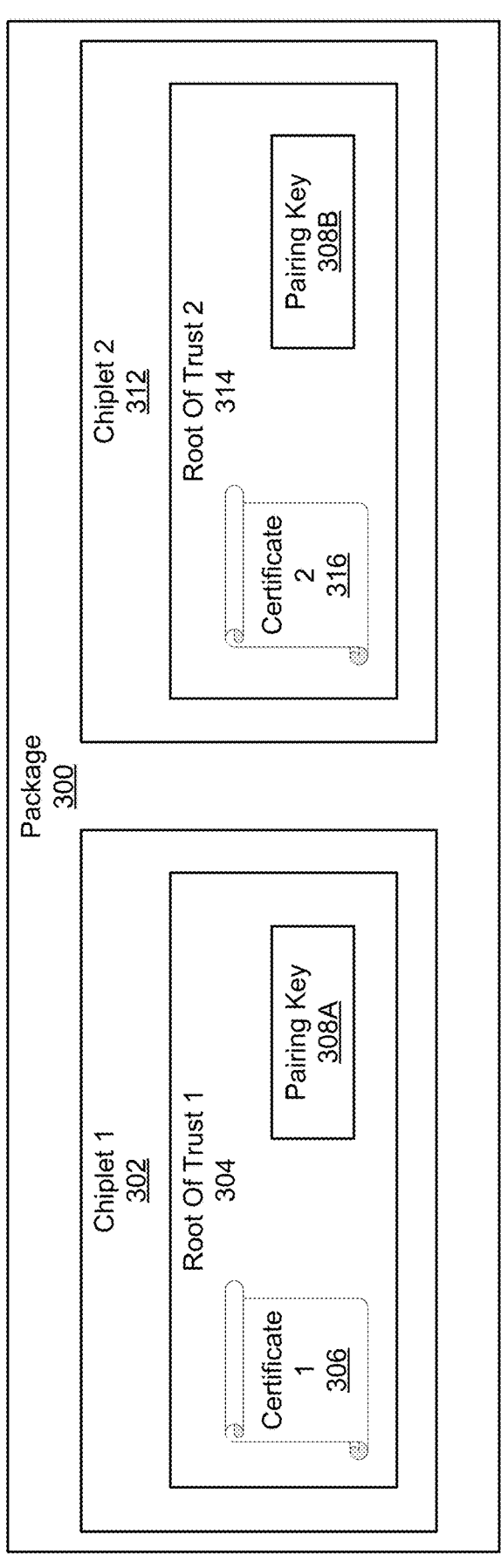
FIG. 3 is a block diagram illustrating component of RoTs of a package for mutual authentication, in accordance with aspects of the present disclosure.

FIG. 3 is a block diagram illustrating component of RoTs of a package 300 for mutual authentication, in accordance with aspects of the present disclosure. In some cases, the ability for the C-RoTs in a package, such as an SoC, to mutually authenticate may be established in stages. As shown in FIG. 3, a first C-RoT 304 of a first chiplet 302 and a second chiplet 312 and a second C-RoT 314 are included in a package 300. In some cases, chiplets may be individually fabricated/sliced. The chiplets may then be selected and packaged together in a package (e.g., the package 300) at a later stage of manufacturing.

As a part of manufacturing, a C-RoT of a chiplet may be provisioned with a certificate. For example, the first C-RoT 304 of the first chiplet 302 may be provisioned with a first certificate 306 and the second C-RoT 314 of the second chiplet 312 may be provisioned with a second certificate 316. In some cases, the first certificate 306 and second certificate 316 may be device certificates. In some cases, the certificates 306 and 316 may be relatively low-level certificates and may be signed by an intermediate certificate or a certificate authority (CA) certificate (e.g., root certificate). Intermediate certificates may be further signed by a root certificate. In some cases, device certificates may be validated using an intermediate public key and intermediate certificates may be validated using a root public key that may be provisioned in the device. In some cases, certificates may be validated using the intermediate or root certificate along with additional data, such as security policies, life cycle state, debug state, etc. In some cases, the additional data may also be written into a respective chiplet, for example by an OEM/ODM, as a part of a manufacturing process (e.g., during configuration, testing, etc.). In some cases, the CA certificate may be validated along with other information, such as security state information, debug state information, security policies, etc. While the certificates 306 and 316 may differ from chiplet to chiplet, the certificates 306 and 316 may be signed by the same CA certificate.

As indicated above, chiplets 302 and 312 may be integrated together into package 300 after the chiplets 302 and 312 are fabricated. In some cases, as a part of manufacturing the package 300, the chiplets 302 and 312 may mutually authenticate so that the C-RoTs 304 and 314 of the chiplets 302 and 312, respectively, can be provisioned with a pairing key. For example, the first C-RoT 304 may receive the second certificate 316 from the second C-RoT 314 along with security state information and debug state information, such as a life-cycle state information security policies, whether the chiplet is in a debug mode, etc. In some cases, the life-cycle state may indicate what part of a life-cycle the chiplet is in (e.g., provisioning, testing, engineering sample, customer sample, operating, etc.). Information security policies may indicate, for example, what security functionalities may be performed if the chiplet is in a trusted state, untrusted state, etc. The debug state may indicate whether the chiplet is in a debug state or a normal operations state. After receiving the second certificate 316, security state, and debug state information from the second C-Rot 314, the first C-RoT 304 may verify the security state and debug state from the second C-Rot 314 matches with a security state and debug state of the first C-RoT 304. The first C-RoT 304 may also verify the certificate (e.g., intermediate or root certificate) using a public key of the CA certificate (that signed second certificate 316) and/or by determining that a hash of the security policies, debug state information, life-cycle state information, and/or other information received with the second certificate 316 matches the hash values written into the first chiplet 302. The first C-RoT 304 may also send the first certificate 306, security state, and debug state to the second C-RoT 314 for authentication and receive an indication from the second C-RoT 314 that the first C-RoT has been authenticated. Once mutually authenticated, the C-RoTs 304 and 314 may be provisioned with a pairing key 308A and 308B, respectively (collectively referred to as pairing keys 308). The pairing keys 308 may be a cryptographic key and the same pairing key 308 may be provisioned for each C-RoTs 304 and 314 of the chiplets 302 and 312 of the package 300. Other packages may have different pairing keys.

In some cases, after the manufacturing stage, the package 300 may be placed into operation. In some cases, mutual authentication during an operations stage may be performed during boot of the package 300 and during run time. For example, as a part of a boot procedure (e.g., sequence of events, actions, processes, etc. performed when the package is powered on, reset, restarted, etc. that initialize and/or prepares the package for use) of the package 300, the C-RoTs 304 and 314 of the chiplets 302 and 312 may perform mutual authentication based on the provisioned certificates 306 and 316, security states, and debug states as described above with respect to mutual authentication as a part of the manufacturing stage. After mutual authentication is performed, the C-RoTs 304 and 314 may extend their respective security boundaries to encompass the mutually authenticated C-RoTs (e.g., establishing a platform security boundary) such that security functionality such as secure boot, key management, access control, authenticated debug, etc. may be performed by any of the mutually authenticated C-RoTs and accepted by the other C-RoTs. In some case, each time the package is booted the C-RoTs of the package may mutually authenticate.

In some cases, the C-RoTs may mutual authenticate regularly while the package is operating to maintain the common security boundary. For example, after mutually authenticating during a boot up process, the C-RoTs may also mutually authenticate while operating, such as when performing certain functions, periodically, semi-periodically, etc. As an example, consent from all C-RoTs may be obtained before altering the security and/or debug state of the package 300 based on mutual authentication. In some cases, maintaining mutual authentication after boot of the package 300 may be performed based on the pairing key 308. For example, after the C-RoTs 304 and 314 have established a common security boundary through mutual authentication during the boot process of the package 300 (e.g., SoC, device, etc.), when requesting a security and/or debug state change the C-RoTs 304 and 314 of the package 300 may mutually authenticate by exchanging pairing keys 308. For example, a C-RoT, such as C-RoT 304 may receive the pairing key 308B from the second C-RoT 314, and the first C-RoT 304 may match the received pairing key 308B against its provisioned pairing key 308A. If the pairing key 308B matches, then the first C-RoT 304 may authenticate the second C-RoT 314, and vice versa.

In some cases, multiple platforms with separate security boundaries may be established in a system, such as an SoC. FIG. 4 is a block diagram illustrating an SoC 400 including multiple platforms with separate security boundaries, in accordance with aspects of the present disclosure. In this example, SoC 400 includes 4 chiplets, a first chiplet 404, a second chiplet 406, a third chiplet 408, and a fourth chiplet 410. In SoC 400, the chiplets may be divided into two packages. A first package 420 includes the first chiplet 404 and the second chiplet 406 and a second package 422 includes the third chiplet 408 and the fourth chiplet 410. The C-RoT in chiplets of a package (e.g., C-RoT 412 and C-RoT 413 for the first package 420 and C-RoT 416 and C-RoT 418 for the second package 422) may mutually authenticate during manufacturing, boot, and in operation in a manner substantially similar to that described above with respect to FIGS. 2 and 3. Thus, C-RoT 412 and C-RoT 414 may establish a first security boundary 430 and C-RoT 416 and C-RoT 418 may establish a second security boundary 432 and a C-RoT. While a C-RoT, such as C-RoT 412, may trust security functions performed within a security boundary, such as the first security boundary 430, the C-RoT 412 may not trust a security function being performed across the security boundaries, such as by C-RoT 416 and/or C-RoT 418 in the second security boundary 432. In some cases, packages of a system, such as SoC 400, may be static and packages of a system may be set up during manufacturing.

As indicated above, once the C-RoTs of a package have established a common security boundary, any C-RoT within the common security boundary may perform security functions as needed. One such security function includes key management and key distribution. For example, a package/SoC ROT may have a device unique key and the package/ROT may derive other keys from the device unique key for other security functions such as user data protection, storage, encryption, etc. As indicated above, a common root of trust may be established across multiple individual RoTs for chiplets of the package. Thus, each ROT of the chiplets of the package should be capable of performing key management and distribution operations from a single device unique key. As an example, a high level operating system and/or application may send a request for a cryptographic key to any RoT of any chiplet of the package to obtain the cryptographic key and that cryptographic key that would be provided at any ROT should be the same. In some cases, techniques for coherent key management may be used to allow each RoTs of the chiplets to provide the same services as the other RoTs. For example, each ROT may be able to provide services such as providing the same key derivation in all of the chiplets, execute a key rotation scheme, swap wrapped keys between chiplets to allow key unwrap in any chiplet of the package, and offload cryptographic workload from any chiplet to any other chiplet.

Figure 5:
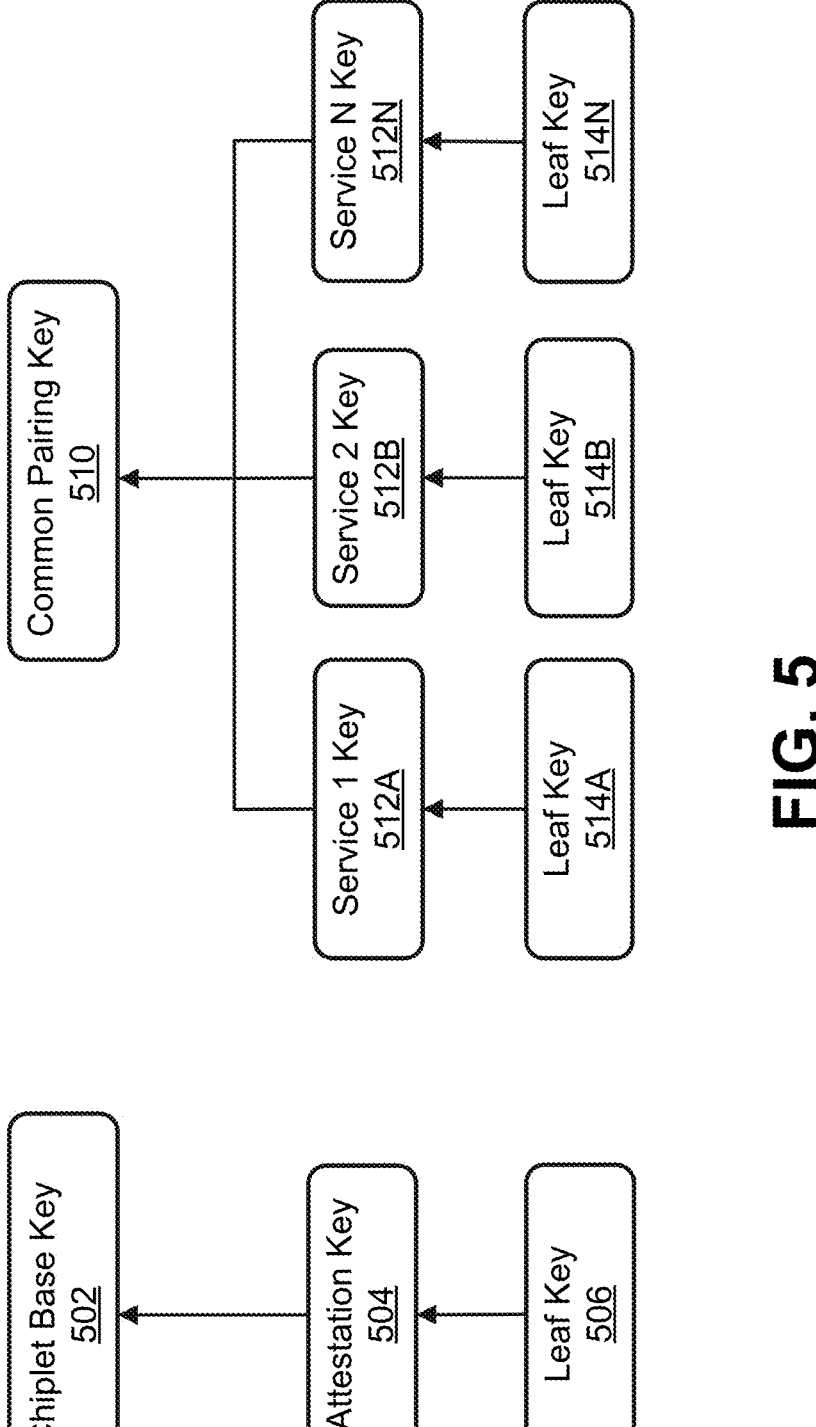
FIG. 5 is a diagram illustrating key derivation using base keys of a chiplet, in accordance with aspects of the present disclosure.

FIG. 5 is a diagram illustrating key derivation using base keys of a chiplet, in accordance with aspects of the present disclosure. In some cases, a C-RoT of a chiplet may have two base keys from which additional keys may be derived using one or more key derivation formulas. For example, the chiplet may be provisioned with a chiplet base key 502 and a common pairing key 510. In some examples, the chiplet base key 502 may be chiplet specific (e.g., each chiplet of a package may have a different chiplet base key 502). The chiplet base key 502 may be provisioned as a part of fabricating the chiplet. The common pairing key 510 may be a cryptographic key that is common to the chiplets of the packaged and the common pairing key 510 may be provisioned to chiplets of the package during manufacturing after the chiplets of the package mutually authenticate. In some cases, the common pairing key 510 may randomly generated by one or more chiplets of the package and provisioned across the chiplets based on mutual authentication. In some cases, the pairing key 308 of FIG. 3 may be derived from the common pairing key 510. In some cases, the common pairing key may be based on a shared secret and derived based on a key exchange protocol. For example, during a mutual authentication process, a first chiplet may provide its public key to a second chiplet. The second chiplet may also provide its public key to the first chiplet. The first chiplet may derive the common pairing key 510 based on its private key and the second chiplets public key. Similarly, the second chiplet also derives the same common pairing key based on its private key and the first chiplets public key.

In some cases, the chiplet base key 502 may be used to derive keys for chiplet specific functions, such as chiplet attestation. In chiplet attestation, the chiplet may provide information (attesting to) hardware components and/or software components of the chiplet to verify the integrity of the chiplet based on one or more attestation keys 504 and/or leaf keys 506 derived from the one or more attestation keys 504.

The common pairing key 510 may be used to derive keys for functions and/or services provided by the package. For example, a per service key 512A, 512B, . . . 512N (collectively referred to as service keys 512) may be derived for each service and leaf keys 514A, 514B, . . . 514N (collectively referred to as leaf keys 514) may be derived for the service, for example, if multiple execution environments are used for the service. In some cases, service keys 512 and leaf keys may be derived based on a key derivation input and metadata. In some cases, the metadata may be provided from the service and/or an application accessing the service. In some cases, a single key derivation input may be used by chiplets of the package. As the common pairing key and key derivation input may be shared by all chiplets of a package, a service key and/or leaf key may be similarly derived based on metadata provided by the service and/or application. Thus, the service and/or application may be able to obtain the same new key from any chiplet of the package.

Figure 6:
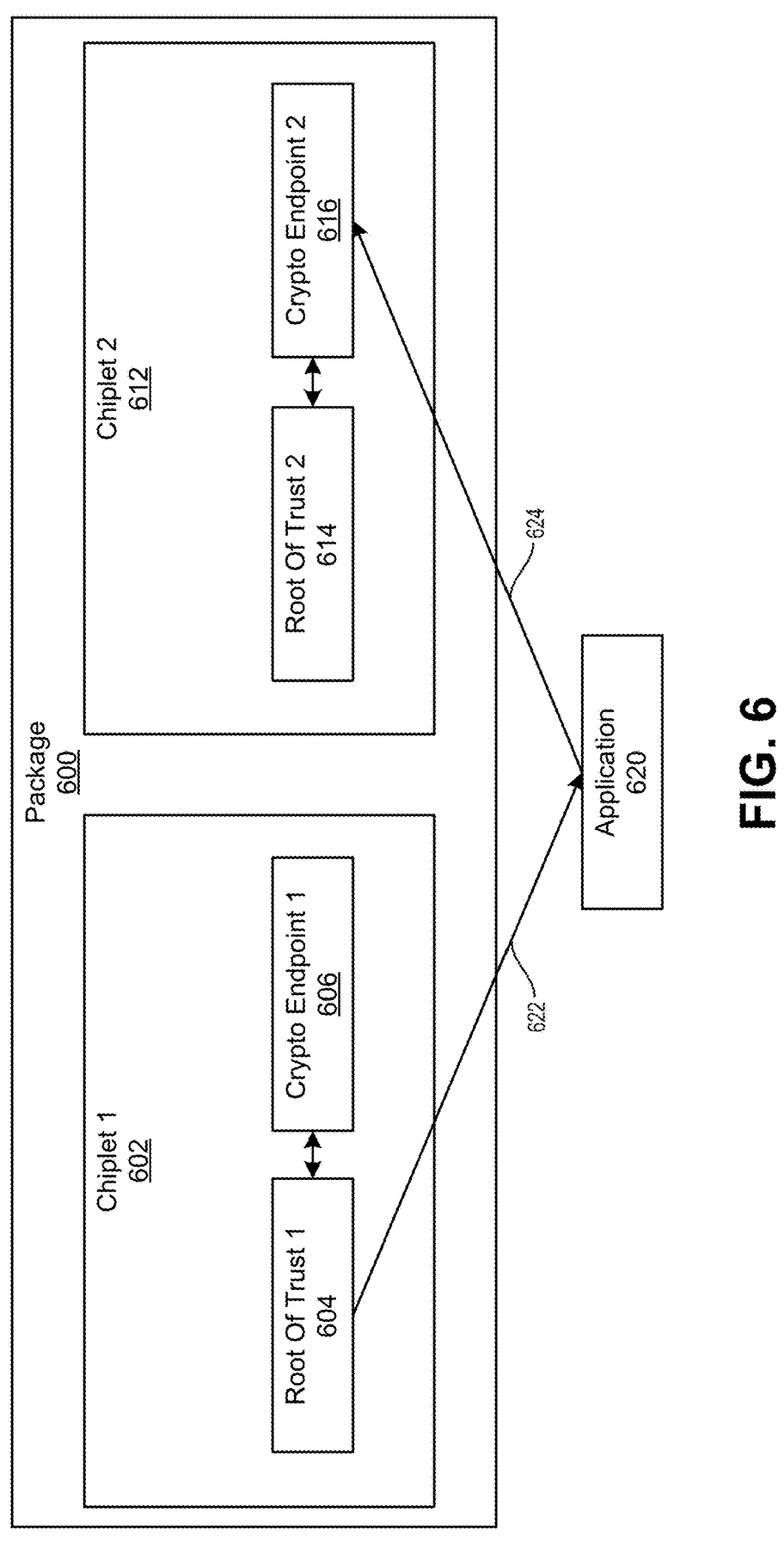
FIG. 6 is a block diagram illustrating key swapping across chiplets, in accordance with aspects of the present disclosure.

FIG. 6 is a block diagram illustrating key swapping across chiplets, in accordance with aspects of the present disclosure. FIG. 6 includes a package 600 with a first chiplet 602 and a second chiplet 612. The first chiplet 602 includes a first C-RoT 604 and the first C-RoT 604 is coupled to a first cryptographic endpoint 606. The second chiplet 612 includes a second C-RoT 614 and the second C-RoT 614 is coupled to a second cryptographic endpoint 616. In this example, the first C-RoT 604 may have mutually authenticated with and established a common security boundary with the second C-RoT 614.

In some cases, it may be useful to allow one C-RoT, such as the first C-RoT 604, of a chiplet, such as the first chiplet 602, to derive a key for an application and move that key to another chiplet, such as the second chiplet 612, for use by the second crypto endpoint 616. For example, an application, such as application 620 may obtain a key from the first chiplet 602 and then the application 620 may be moved to chiplet 2 612 for execution and may use the second C-RoT 612 and second cryptographic endpoint 616 to perform a cryptographic operation. This flexibility to move cryptographic workloads may allow the application 620 move to whichever chiplet is best positioned to perform the task and maintain quick access to cryptographic services such as key management services, such as key derivation, key export, key wrapping, key deletion, encoding/decoding, obtaining new keys, Symmetric/Asymmetric crypto operations, etc. Of note, while shown separate from the package 600, it should be understood that the application 620 may be a higher-level application, operating system, high-level operating system or any other application that may be executing on one or more chiplets of the package 600.

To enable such flexibility for application 620, the C-RoTs 604 and 614 may wrap a cryptographic key to allow the cryptographic key to be moved (e.g., transported) from one C-RoT to another. In some cases, wrapping a cryptographic key encrypts the cryptographic key using another cryptographic key to allow the wrapped key to be more securely transported. For example, the C-RoTs may include one or more cryptographic endpoints, such as cryptographic endpoints 606 and 616. A cryptographic endpoint may be part of the chiplet/C-RoT and the cryptographic endpoint may have a hardware interface with the C-RoT that allows the cryptographic endpoint to receive transport keys securely. The cryptographic endpoint may also be accessed by other system components like CPU, storage controller, other subsystems, etc. to perform cryptographic operations. In some cases, the cryptographic endpoints 606 and 616 may take a wrapped cryptographic key from the C-RoTs 604 and 614, unwrap the cryptographic key, and perform cryptographic functions using the encryption key. Unwrapping a cryptographic key decrypts the encryption of the wrapped cryptographic key to obtain the wrapped cryptographic key. In some cases, wrapping the cryptographic key the C-RoTs 604 and 614 encrypts the cryptographic key using a common transport key which is shared between the C-RoTs 604 and 614 and the cryptographic endpoints 606 and 616. For example, the common transport key may be derived from a common pairing key using a known key derivation input, for example, during a security state check. In some cases, the transport key may be ephemeral for a given session (e.g., per boot). A common transport key may be a cryptographic key that may be used to wrap other cryptographic keys and the common transport key may be available at the C-RoTs (e.g., shared) so they C-RoTs may move data between the C-RoTs. A C-RoT, such as the first C-RoT 604, may provide a cryptographic endpoint, such as cryptographic endpoint 606, with the wrapped cryptographic key and the cryptographic endpoint may unwrap (e.g., decrypt) the wrapped cryptographic key to perform the cryptographic function. Of note, while shown as separate from the C-RoTs 604 and 614, it should be understood that the cryptographic endpoints 606 and 616 may be integrated with the C-RoTs 604 and 614 such that operations performed by the cryptographic endpoints 606 and 616 may be performed by the C-RoTs 604 and 614.

As an example of utilizing the wrapped cryptographic key on another C-RoT of the package, an application 620 may request a cryptographic key from the first C-RoT 604. In response to the request, the first C-RoT 604 may generate the cryptographic key, for example, based on a common pairing key, such as common pairing key 510 of FIG. 5. The first C-RoT 604 may wrap the generated cryptographic key with the common transport key. The first C-RoT 604 may then provide 622 the wrapped cryptographic key (e.g., a cryptographic key that has been encrypted by another cryptographic key) to the application 620. The application 620 may then provide 624 the wrapped cryptographic key to the second cryptographic endpoint 616 of the second C-RoT 614 of the second chiplet 612. The second cryptographic endpoint 616 may then unwrap the cryptographic key based on the common transport key and perform a requested security operation.

In addition to the common transport key, the chiplets may also be provisioned with a key swap key. In some cases, the key swap key may be a cryptographic key used to wrap a cryptographic key and store a cryptographic key in a persistent storage, such as a memory like flash or system memory. In some cases, the key swap key may be similar to the transport key (e.g., a cryptographic key that may be used to wrap other cryptographic keys), but the key swap key may be used to wrap a cryptographic key to be stored in a persistent storage. The key swap key may also be shared between the C-RoTs 604 and 614 and the cryptographic endpoints 606 and 616. For example, the key swap key may be derived from a common pairing key using a known key derivation input, for example, during a security state check. In some cases, the transport key may be ephemeral for a given session (e.g., per boot). As an example, the first C-RoT 604 may generate the cryptographic key and wrap the generated cryptographic key with the key swap key. In some cases, the first C-RoT 604 may generate and wrap the cryptographic key absent an explicit request from the application 620. The first C-RoT 412 may then store the wrapped key in a memory, such as a cache memory internal to the first chiplet 602, or external memory, such as a system memory (e.g., dynamic random access memory). The memory may be internal or external to the first chiplet 602. If, for example, the application 620, then requests the stored, wrapped key, the first C-RoT 412 (or any other C-RoT, such as the second C-RoT 414) may unwrap the requested wrapped cryptographic key using the key swap key and wrap the requested cryptographic key using the common transport key. The first C-RoT 412 may provide 622 the wrapped (with the common transport key) cryptographic key to the application 620. The application 620 may then provide 624 the wrapped cryptographic key to the second cryptographic endpoint 616 and the cryptographic endpoint may unwrap the wrapped cryptographic key and perform security operation using the unwrapped cryptographic key.

As indicated above, one or more wrapping keys (e.g., cryptographic keys that may be used to wrap other cryptographic keys), such as a key swap key or common transport key, may be used to wrap a cryptographic key. The one or more wrapping keys may be shared between the C-RoTs and/or cryptographic endpoints of a package that have a common security boundary to allow a cryptographic key generated by one C-RoT to be used by another C-RoT. In some cases, the one or more wrapping keys may be shared between the C-RoTs as a part of a security state check procedure during a boot process for the chiplets. Of note, in some cases, the wrapping keys may be provided to the C-RoTs of the chiplets of the package (e.g., as a part of the security state check procedure) and the cryptographic endpoints may access the wrapping keys as needed. In some cases, the wrapping keys may be derived from the common pairing key, such as common pairing key 510 of FIG. 5. Of note, the security state check procedure 700 is an example of a technique for generating and providing wrapping keys to the C-RoTs of the chiplets, but other techniques capable of generating and providing wrapping keys to the C-RoTs may be used in place of the security state check procedure.

Figure 7:
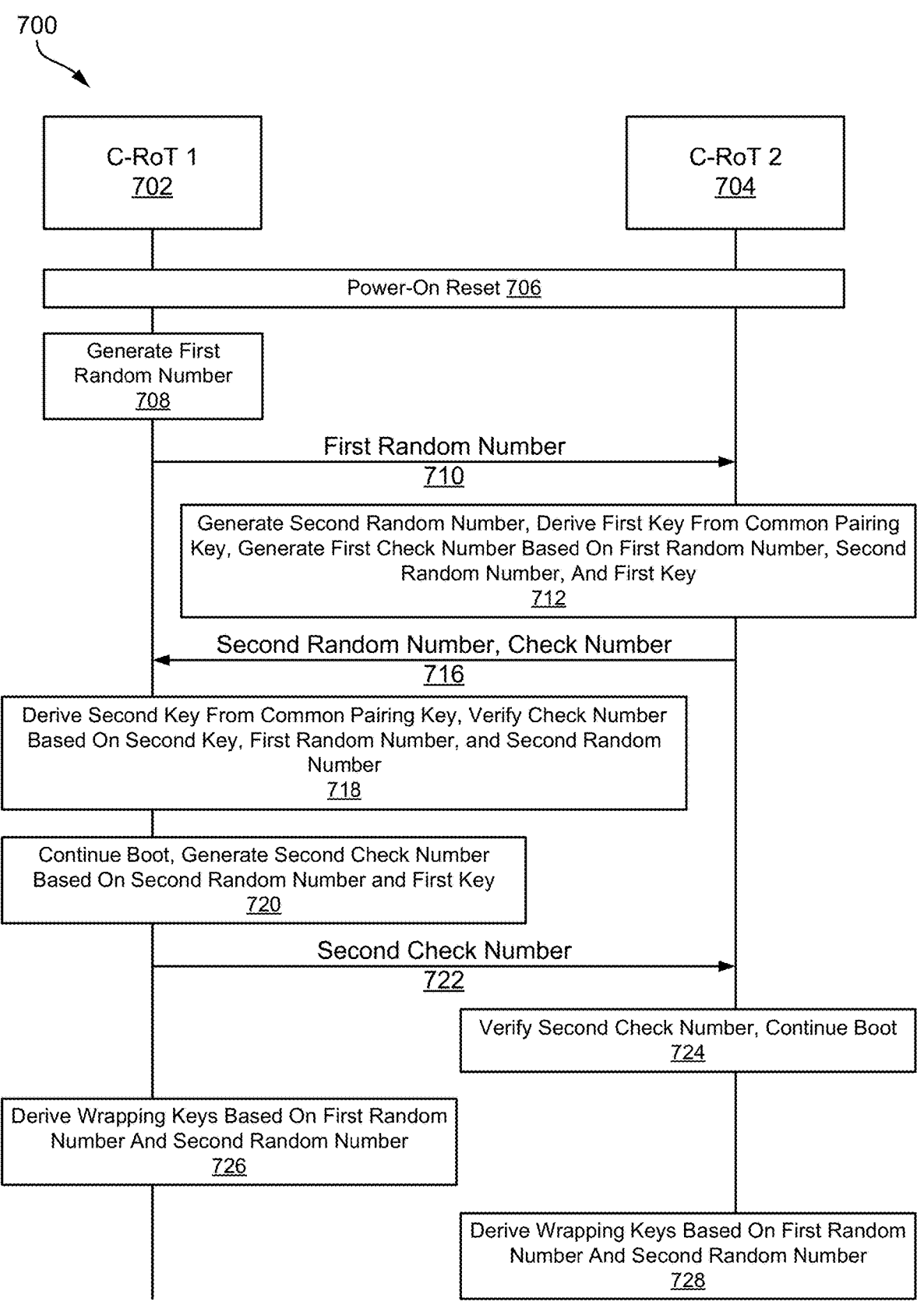
FIG. 7 is a call flow diagram of a security state check procedure for a package, in accordance with aspects of the present disclosure.

FIG. 7 is a call flow diagram of a security state check procedure 700 for a package, in accordance with aspects of the present disclosure. FIG. 7 includes a first C-RoT 702 and a second C-RoT 704 which are located in different chiplets. The C-RoTs 702 and 704 may be similar to C-RoTs 412 and 414 of FIG. 4 and C-RoTs 604 and 614 of FIG. 6. At step 706, the C-RoTs 702 and 704 may be powered on/reset and may begin their boot process. As a part of the boot process, at step 708, the first C-RoT 702 may generate a first random number (e.g., p_nonce). At step 710, the first C-RoT 702 may send the first random number to the second C-RoT 704. The second C-RoT 704 may receive the first random number and at step 712, the second C-RoT 704 may generate a second random number. The second C-RoT 704 may also generate a first key K from the provisioned pairing key, such as pairing key 308 of FIG. 3. The second C-RoT 704 may also generate a first check number based on the first key K, the first random number, and the second random number along with the security and debug state of the second chiplet. At step 716, the second C-RoT 704 may send the second random number and the first check number to the first C-RoT 702.

At step 718, the first C-RoT 702 may derive a second key from the provisioned pairing key. As described above with respect to FIG. 3, as the C-RoTs of the package may be provisioned with the same pairing key, the derived second key should match the first key K. The first C-RoT 702 may then verify the first check number received from the second C-RoT 704 by generating a check number based on the second key, the first random number, and the second random number. If the first check number received from the second C-RoT 704 does not match the check number generated by the first C-RoT 702, then the first C-RoT 702 may determine that the security state between the first C-RoT 702 and second C-RoT 704 is not valid and the first C-RoT 702 may perform some action to address the invalid security state such as halting the boot process, resetting the package, etc. If the first check number received from the second C-RoT 704 matches the check number generated by the first C-RoT 702, then the first C-RoT 702 may determine that the security state between the first C-RoT 702 and second C-RoT 704 is valid and continue the boot process at step 720. If the security state is determined to be valid, the first C-RoT 702 may also, at step 720, generate a second check number based on the first random number, second random number, and the first key K along with the security and debug state of the first chiplet. At step 722, the first C-RoT 702 may send the second check number to the second C-RoT 704.

The second C-RoT 704 may receive the second check number, and, at step 724, the second C-RoT 704 may verify the received second check number by generating a check number based on second key and second random number. If the second check number received from the first C-RoT 702 does not match the check number generated by the second C-RoT 704, then the second C-RoT 704 may determine that the security state between the first C-RoT 702 and second C-RoT 704 is not valid and the second C-RoT 704 may perform some action address the invalid security state such as halting the boot process, resetting the package, etc. If the second check number received from the first C-RoT 702 matches the check number generated by the second C-RoT 704, then the second C-RoT 704 may determine that the security state between the first C-RoT 702 and second C-RoT 704 is valid and continue the boot process at step 724.

At step 726, the first C-RoT 702 may derive one or more wrapping keys, such as the common transport key and/or key swap key, from the pairing key based on the first random number and the second random number. For example, keys may be derived as a function of the pairing key using one or more parameters and one or more of the parameters may be based on a function of the first random number and second random number to derive the one or more wrapping keys. At step 728, the second C-RoT 704 also derives the one or more wrapping keys in a manner substantially similar to that described above at step 726. As the first random number, second random number, and first/second key K match between the first C-RoT 702 and second C-RoT 704, the derived wrapping keys should also match.

FIG. 8 is a flow diagram illustrating an example of a process 800 for secure processing, in accordance with aspects of the present disclosure. The process 800 may be performed by a wireless device or by a component (e.g., SoC 100 of FIG. 1, SoC 200 of FIG. 2, chiplets 204-210 of FIG. 2, C-RoTs 212-218 of FIG. 2, package 300 of FIG. 3, chiplets 302 and 312 of FIG. 3, C-RoTs 304 and 314 of FIG. 3, SoC 400 of FIG. 4, chiplets 404-410 of FIG. 4, C-RoTs 412-418 of FIG. 4, chiplets 602 and 612 of FIG. 6, C-RoTs 604 and 614 of FIG. 6, C-RoTs 702 and 704 of FIG. 7, processor 910 of FIG. 9, etc.) or system (e.g., a chipset) of the wireless device (e.g., computing system 900). The electronic device may be a wireless device, such as computing system 900, or a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network node. In some examples, the process 800 may be performed by a UE. The operations of the process 800 may be implemented, in part, as software components that are executed and run on one or more processors (e.g., CPU 102 of FIG. 1, chiplets 204-210 of FIG. 2, C-RoTs 212-218 of FIG. 2, chiplets 302 and 312 of FIG. 3, C-RoTs 304 and 314 of FIG. 3, chiplets 404-410 of FIG. 4, C-RoTs 412-418 of FIG. 4, chiplets 602 and 612 of FIG. 6, C-RoTs 604 and 614 of FIG. 6, C-RoTs 702 and 704 of FIG. 7, processor 910 of FIG. 9, or other processor(s)).

At block 802, the computing device (or component thereof) may receive, at a first chiplet root of trust (C-RoT) (e.g., C-RoT 212 of FIG. 2, C-RoT 304 of FIG. 3, C-RoT 412 of FIG. 4, C-RoT 604 of FIG. 6, C-RoT 702 of FIG. 7) of a first chiplet (e.g., first chiplet 204 of FIG. 2, first chiplet 302 of FIG. 3, first chiplet 404 of FIG. 4, first chiplet 602 of FIG. 6) of the plurality of chiplets, a request for a cryptographic key (e.g., attestation key 504, leaf key 506, service keys 512, and leaf keys 514 of FIG. 5).

At block 804, the computing device (or component thereof) may generate, by the first C-RoT, the cryptographic key. In some cases, the cryptographic key is generated based on a common pairing key (e.g., common pairing key 510 of FIG. 5). In some cases, the wrapping key is provisioned to C-RoTs of the plurality of chiplets. In some cases, the wrapping key is provisioned during a boot procedure of the processor system.

At block 806, the computing device (or component thereof) may wrap, by the first C-RoT, the cryptographic key using a wrapping key to generate a wrapped cryptographic key. In some cases, wrapping a cryptographic key encrypts the cryptographic key using another cryptographic key to allow the wrapped key to be more securely transported/ stored. In some cases, wrapping the cryptographic key comprises encrypting, by the first C-RoT, the cryptographic key using the wrapping key. In some cases, the wrapping key comprises one of a common transport key or a key swap key. In some cases, the wrapping key is a key swap key and the computing device (or component thereof) outputs the wrapped cryptographic key by storing the wrapped cryptographic key in the memory system. In such cases, the wrapped cryptographic key is received from the memory system.

At block 808, the computing device (or component thereof) may output, by the first C-RoT, the wrapped cryptographic key. In some cases, the common pairing key is provisioned to two or more C-RoTs of the plurality of chiplets. In some cases, the common pairing key may be provisioned (e.g., provided) to the C-RoTs as a part of manufacturing the chiplets.

At block 810, the computing device (or component thereof) may receive the wrapped cryptographic key at a second chiplet (e.g., second chiplet 206 of FIG. 2, second chiplet 332 of FIG. 3, second chiplet 406 of FIG. 4, second chiplet 612 of FIG. 6) of the plurality of chiplets.

At block 812, the computing device (or component thereof) may unwrap the wrapped cryptographic key at the second chiplet using the wrapping key. In some cases, unwrapping a cryptographic key decrypts the encryption of the wrapped cryptographic key to obtain the wrapped cryptographic key. In some cases, the wrapped cryptographic key is received at a cryptographic endpoint associated with the second C-RoT. The cryptographic endpoint may be a hardware interface of the C-RoT. In some cases, the wrapped cryptographic key is unwrapped by the cryptographic endpoint.

At block 814, the computing device (or component thereof) may perform, by the second C-RoT, an operation based on the cryptographic key. Examples of such operations may include key management services, such as key derivation, key export, key wrapping, key deletion, encoding/decoding, obtaining new keys, Symmetric/Asymmetric crypto operations, and the like.

In some examples, the processes described herein (e.g., process 800, and/or other process described herein) may be performed by a computing device or apparatus (e.g., a network node such as a UE, base station, a portion of a base station, etc.). For example, as noted above, one or more of the processes described herein (e.g., the process 800, and/or other process described herein) may be performed by a UE.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 800 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, process 800 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
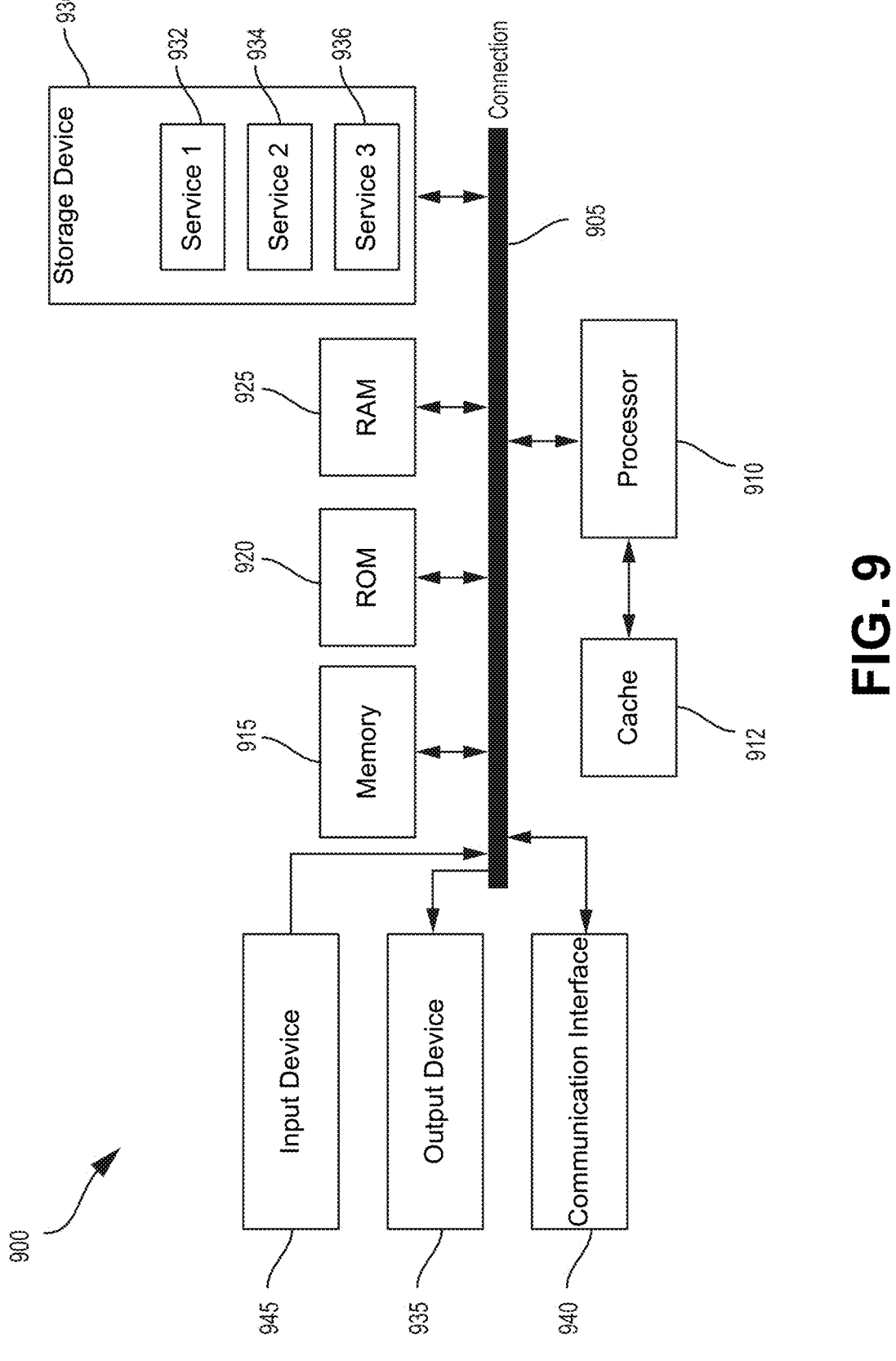
FIG. 9 is a block diagram illustrating an example of a computing system, in accordance with some examples.

FIG. 9 is a diagram illustrating an example of a system for implementing certain aspects of the present technology. In particular, FIG. 9 illustrates an example of computing system 900, which may be for example any computing device making up internal computing system, a remote computing system, a camera, or any component thereof in which the components of the system are in communication with each other using connection 905. Connection 905 may be a physical connection using a bus, or a direct connection into processor 910, such as in a chipset architecture. Connection 905 may also be a virtual connection, networked connection, or logical connection.

In some aspects, computing system 900 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example computing system 900 includes at least one processing unit (CPU or processor) 910 and connection 905 that communicatively couples various system components including system memory 925, such as read-only memory (ROM) 920 and random access memory (RAM) 925 to processor 910. Computing system 900 may include a cache of high-speed memory connected directly with, in close proximity to, or integrated as part of processor 910.

Processor 910 may include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms. In some instances, multimodal systems may enable a user to provide multiple types of input/output to communicate with computing system 900.

Computing system 900 may include communications interface 940, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/Re-RAM), phase change memory (PCM), spin transfer torque RAM (STT-RAM), another memory chip or cartridge, and/ or a combination thereof.

The storage device 930 may include software services, servers, services, etc., that when the code that defines such software is executed by the processor 910, it causes the system to perform a function. In some aspects, a hardware service that performs a particular function may include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices.

Any features described as modules or components may be implemented together in an integrated logic device or separately as discrete but interoperable logic devices. If implemented in software, the techniques may be realized at least in part by a computer-readable data storage medium comprising program code including instructions that, when executed by one or more processors, performs one or more of the methods, algorithms, and/or operations described above. The computer-readable data storage medium may form part of a computer program product, which may include packaging materials. The computer-readable medium and/or memory system may comprise any memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, memory 915, read-only memory (ROM) 920, random access memory (RAM) 925, storage device 930, and the like, and the computer-readable medium may include multiple memories or data storage media. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An electronic device, comprising: a memory system comprising instructions; and a processor system coupled to the memory system, the processor system including a plurality of chiplets, wherein the processor system is configured to: receive, at a first chiplet root of trust (C-RoT) of a first chiplet of the plurality of chiplets, a request for a cryptographic key; generate, by the first C-RoT, the cryptographic key; wrap, by the first C-RoT, the cryptographic key using a wrapping key to generate a wrapped cryptographic key; output, by the first C-RoT, the wrapped cryptographic key; receive the wrapped cryptographic key at a second chiplet of the plurality of chiplets; unwrap the wrapped cryptographic key at the second chiplet using the wrapping key; and perform, by the second C-RoT, an operation based on the cryptographic key.

Aspect 2. The electronic device of Aspect 1, wherein, to wrap the cryptographic key, the processor system is configured to encrypt, by the first C-RoT, the cryptographic key using the wrapping key.

Aspect 3. The electronic device of any of Aspects 1-2, wherein the cryptographic key is generated based on a common pairing key.

Aspect 4. The electronic device of Aspect 3, wherein the common pairing key is provisioned to two or more C-RoTs of the plurality of chiplets.

Aspect 5. The electronic device of any of Aspects 1-4, wherein the wrapped cryptographic key is received at a cryptographic endpoint associated with the second C-RoT.

Aspect 6. The electronic device of Aspect 5, wherein the wrapped cryptographic key is unwrapped by the cryptographic endpoint.

Aspect 7. The electronic device of any of Aspects 1-6, wherein the wrapping key comprises one of a common transport key or a key swap key.

Aspect 8. The electronic device of Aspect 7, wherein the wrapping key comprises a key swap key and wherein, to output the wrapped cryptographic key, the processor system is configured to store the wrapped cryptographic key in the memory system, and wherein the wrapped cryptographic key is received from the memory system.

Aspect 9. The electronic device of any of Aspects 1-8, wherein the wrapping key is provisioned to C-RoTs of the plurality of chiplets.

Aspect 10. The electronic device of any of Aspects 1-9, wherein the wrapping key is provisioned during a boot procedure of the processor system.

Aspect 11. A method for secure processing, comprising: receiving, at a first chiplet root of trust (C-RoT) of a first chiplet of a plurality of chiplets, a request for a cryptographic key; generating, by the first C-RoT, the cryptographic key; wrapping, by the first C-RoT, the cryptographic key using a wrapping key to generate a wrapped cryptographic key; outputting, by the first C-RoT, the wrapped cryptographic key; receiving the wrapped cryptographic key at a second chiplet of the plurality of chiplets; unwrapping the wrapped cryptographic key at the second chiplet using the wrapping key; and performing, by the second C-RoT, an operation based on the cryptographic key.

Aspect 12. The method of Aspect 11, wherein wrapping the cryptographic key comprises encrypting, by the first C-RoT, the cryptographic key using the wrapping key.

Aspect 13. The method of any of Aspects 11-12, wherein the cryptographic key is generated based on a common pairing key.

Aspect 14. The method of Aspect 13, wherein the common pairing key is provisioned to two or more C-RoTs of the plurality of chiplets.

Aspect 15. The method of any of Aspects 11-14, wherein the wrapped cryptographic key is received at a cryptographic endpoint associated with the second C-RoT.

Aspect 16. The method of Aspect 15, wherein the wrapped cryptographic key is unwrapped by the cryptographic endpoint.

Aspect 17. The method of any of Aspects 11-16, wherein the wrapping key comprises one of a common transport key or a key swap key.

Aspect 18. The method of Aspect 17, wherein the wrapping key comprises a key swap key and wherein outputting the wrapped cryptographic key comprises storing the wrapped cryptographic key in a memory system, and wherein the wrapped cryptographic key is received from the memory system.

Aspect 19. The method of any of Aspects 11-18, wherein the wrapping key is provisioned to C-RoTs of the plurality of chiplets.

Aspect 20. The method of any of Aspects 11-19, wherein the wrapping key is provisioned during a boot procedure of the plurality of chiplets.

Aspect 21. A non-transitory computer-readable medium having stored thereon instructions that, when executed by a processor system, cause the processor system to: receive, at a first chiplet root of trust (C-RoT) of a first chiplet of a plurality of chiplets, a request for a cryptographic key; generate, by the first C-RoT, the cryptographic key; wrap, by the first C-RoT, the cryptographic key using a wrapping key to generate a wrapped cryptographic key; output, by the first C-RoT, the wrapped cryptographic key; receive the wrapped cryptographic key at a second chiplet of the plurality of chiplets; unwrap the wrapped cryptographic key at the second chiplet using the wrapping key; and perform, by the second C-RoT, an operation based on the cryptographic key.

Aspect 22. The non-transitory computer-readable medium of Aspect 21, wherein, to wrap the cryptographic key, the instructions further cause the processor system to cryptographically encrypting, by the first C-RoT, the cryptographic key using the wrapping key.

Aspect 23. The non-transitory computer-readable medium of any of Aspects 21-22, wherein the cryptographic key is generated based on a common pairing key.

Aspect 24. The non-transitory computer-readable medium of Aspect 23, wherein the common pairing key is provisioned to two or more C-RoTs of the plurality of chiplets.

Aspect 25. The non-transitory computer-readable medium of any of Aspects 21-24, wherein the wrapped cryptographic key is received at a cryptographic endpoint associated with the second C-RoT.

Aspect 26. The non-transitory computer-readable medium of Aspect 25, wherein the wrapped cryptographic key is unwrapped by the cryptographic endpoint.

Aspect 27. The non-transitory computer-readable medium of any of Aspects 21-26, wherein the wrapping key comprises one of a common transport key or a key swap key.

Aspect 28. The non-transitory computer-readable medium of Aspect 27, wherein the wrapping key comprises a key swap key and wherein, to output the wrapped cryptographic key, the instructions cause the processor system to store the wrapped cryptographic key in a memory system, and wherein the wrapped cryptographic key is received from the memory system.

Aspect 29. The non-transitory computer-readable medium of any of Aspects 21-28, wherein the wrapping key is provisioned to C-RoTs of the plurality of chiplets.

Aspect 30. The non-transitory computer-readable medium of any of Aspects 21-29, wherein the wrapping key is provisioned during a boot procedure of the plurality of chiplets.

Aspect 31. An apparatus for wireless communications, comprising one or more means for performing operations according to any of Aspects 11 to 20.

What is claimed is:
1. An electronic device, comprising:
a memory system comprising instructions; and
a processor system coupled to the memory system, the processor system including a plurality of chiplets, wherein the processor system is configured to:
    receive, at a first chiplet root of trust (C-RoT) of a first chiplet of the plurality of chiplets, a request for a cryptographic key;
    generate, by the first C-RoT, the cryptographic key;
    wrap, by the first C-RoT, the cryptographic key using a wrapping key to generate a wrapped cryptographic key;
    output, by the first C-RoT, the wrapped cryptographic key for a second C-RoT of a second chiplet of the plurality of chiplets;
    receive the wrapped cryptographic key at the second C-RoT of the second chiplet of the plurality of chiplets;
    unwrap the wrapped cryptographic key by the second C-RoT of the second chiplet using the wrapping key; and
    perform, by the second C-RoT, an operation based on the cryptographic key.

2. The electronic device of claim 1, wherein, to wrap the cryptographic key, the processor system is configured to encrypt, by the first C-RoT, the cryptographic key using the wrapping key.

3. The electronic device of claim 1, wherein the cryptographic key is generated based on a common pairing key.

4. The electronic device of claim 3, wherein the common pairing key is provisioned to two or more C-RoTs of the plurality of chiplets.

5. The electronic device of claim 1, wherein the wrapped cryptographic key is received at a cryptographic endpoint associated with the second C-RoT.

6. The electronic device of claim 5, wherein the wrapped cryptographic key is unwrapped by the cryptographic endpoint.

7. The electronic device of claim 1, wherein the wrapping key comprises one of a common transport key or a key swap key.

8. The electronic device of claim 7, wherein the wrapping key comprises a key swap key and wherein, to output the wrapped cryptographic key, the processor system is configured to store the wrapped cryptographic key in the memory system, and wherein the wrapped cryptographic key is received from the memory system.

9. The electronic device of claim 1, wherein the wrapping key is provisioned to C-RoTs of the plurality of chiplets.

10. The electronic device of claim 1, wherein the wrapping key is provisioned during a boot procedure of the processor system.

11. A method for secure processing, comprising:
receiving, at a first chiplet root of trust (C-RoT) of a first chiplet of a plurality of chiplets, a request for a cryptographic key;
generating, by the first C-RoT, the cryptographic key;
wrapping, by the first C-RoT, the cryptographic key using a wrapping key to generate a wrapped cryptographic key;
outputting, by the first C-RoT, the wrapped cryptographic key for a second C-RoT of a second chiplet of the plurality of chiplets;
receiving the wrapped cryptographic key at the second C-RoT of the second chiplet of the plurality of chiplets;
unwrapping, the wrapped cryptographic key by the second C-RoT of the second chiplet using the wrapping key; and
performing, by the second C-RoT, an operation based on the cryptographic key.

12. The method of claim 11, wherein wrapping the cryptographic key comprises encrypting, by the first C-RoT, the cryptographic key using the wrapping key.

13. The method of claim 11, wherein the cryptographic key is generated based on a common pairing key.

14. The method of claim 13, wherein the common pairing key is provisioned to two or more C-RoTs of the plurality of chiplets.

15. The method of claim 11, wherein the wrapped cryptographic key is received at a cryptographic endpoint associated with the second C-RoT.

16. The method of claim 15, wherein the wrapped cryptographic key is unwrapped by the cryptographic endpoint.

17. The method of claim 11, wherein the wrapping key comprises one of a common transport key or a key swap key.

18. The method of claim 17, wherein the wrapping key comprises a key swap key and wherein outputting the wrapped cryptographic key comprises storing the wrapped cryptographic key in a memory system, and wherein the wrapped cryptographic key is received from the memory system.

19. The method of claim 11, wherein the wrapping key is provisioned to C-RoTs of the plurality of chiplets.

20. The method of claim 11, wherein the wrapping key is provisioned during a boot procedure of the plurality of chiplets.

21. A non-transitory computer-readable medium having stored thereon instructions that, when executed by a processor system, cause the processor system to:

receive, at a first chiplet root of trust (C-RoT) of a first chiplet of a plurality of chiplets, a request for a cryptographic key;

generate, by the first C-RoT, the cryptographic key;

wrap, by the first C-RoT, the cryptographic key using a wrapping key to generate a wrapped cryptographic key;

output, by the first C-RoT, the wrapped cryptographic key for a second C-RoT of a second chiplet of the plurality of chiplets;

receive the wrapped cryptographic key at the second C-RoT of the second chiplet of the plurality of chiplets;

unwrap the wrapped cryptographic key by the second C-RoT of the second chiplet using the wrapping key; and perform, by the second C-RoT, an operation based on the cryptographic key.

22. The non-transitory computer-readable medium of claim 21, wherein, to wrap the cryptographic key, the instructions further cause the processor system to cryptographically encrypting, by the first C-RoT, the cryptographic key using the wrapping key.

23. The non-transitory computer-readable medium of claim 21, wherein the cryptographic key is generated based on a common pairing key.

24. The non-transitory computer-readable medium of claim 23, wherein the common pairing key is provisioned to two or more C-RoTs of the plurality of chiplets.

25. The non-transitory computer-readable medium of claim 21, wherein the wrapped cryptographic key is received at a cryptographic endpoint associated with the second C-RoT.

26. The non-transitory computer-readable medium of claim 25, wherein the wrapped cryptographic key is unwrapped by the cryptographic endpoint.

27. The non-transitory computer-readable medium of claim 21, wherein the wrapping key comprises one of a common transport key or a key swap key.

28. The non-transitory computer-readable medium of claim 27, wherein the wrapping key comprises a key swap key and wherein, to output the wrapped cryptographic key, the instructions cause the processor system to store the wrapped cryptographic key in a memory system, and wherein the wrapped cryptographic key is received from the memory system.

29. The non-transitory computer-readable medium of claim 21, wherein the wrapping key is provisioned to C-RoTs of the plurality of chiplets.

30. The non-transitory computer-readable medium of claim 21, wherein the wrapping key is provisioned during a boot procedure of the plurality of chiplets.

* * * * *